(12) United States Patent
Maruta et al.

(10) Patent No.: US 8,404,757 B2
(45) Date of Patent: Mar. 26, 2013

(54) RADIATION CURABLE SEALING AGENT COMPOSITION AND MEMBER WITH SEALING LAYER

(75) Inventors: Riichiro Maruta, Yokkaishi (JP); Haruhiko Nishida, Amagasaki (JP)

(73) Assignee: Huntsman International LLC, The Woodlands, TX (US)

(*) Notice: Subject to any disclaimer, the term of this patent is extended or adjusted under 35 U.S.C. 154(b) by 185 days.

(21) Appl. No.: 12/999,383

(22) PCT Filed: Jun. 17, 2009

(86) PCT No.: PCT/JP2009/061017
§ 371 (c)(1),
(2), (4) Date: Dec. 16, 2010

(87) PCT Pub. No.: WO2009/154224
PCT Pub. Date: Dec. 23, 2009

(65) Prior Publication Data
US 2011/0092611 A1    Apr. 21, 2011

(30) Foreign Application Priority Data

Jun. 20, 2008 (JP) .................................. 2008-162174

(51) Int. Cl.
*C08F 299/06* (2006.01)
(52) U.S. Cl. ........................................... 522/96; 522/97
(58) Field of Classification Search ................... 522/83, 522/96, 97, 173
See application file for complete search history.

(56) References Cited

U.S. PATENT DOCUMENTS

| 5,945,463 | A  | * | 8/1999 | Kawabuchi et al. | ............ 522/96 |
| 7,196,120 | B2 | * | 3/2007 | Boldt | ............................. 522/8 |

FOREIGN PATENT DOCUMENTS

| JP | 2005-060465 | 3/2005 |
| JP | 2007-314779 | 12/2007 |
| JP | 2008-127475 | 6/2008 |

* cited by examiner

*Primary Examiner* — Margaret Moore

(57) ABSTRACT

An photo-curable sealing agent composition comprising (A) an unsaturated group-containing urethane resin having a number average molecular weight of 1,000-100,000 and an unsaturation degree of 0.1-1 mol/kg, which is obtained by reaction of (a) a polycarbonate diol having a number average molecular weight of 500-3,000, (b) a bifunctional epoxy (meth)acrylate having two hydroxyl groups and two ethylenically unsaturated groups, and (c) a polyisocyanate; (B) a (meth)acrylic acid ester monomer, wherein an alcohol residue, ester-bonded with an (meth)acyloyl group, is a hydrocarbon group which may contain an oxygen atom, and has 1-20 carbon atoms and a molecular weight of not larger than 1,000; and (C) a photo-polymerization initiator. The sealing agent composition exhibits a high curability performance and gives a cured product having a low hardness and enhanced flexibility and elongation, and improved physical and mechanical strength and enhanced durability.

8 Claims, 1 Drawing Sheet

RADIATION CURABLE SEALING AGENT COMPOSITION AND MEMBER WITH SEALING LAYER

CROSS REFERENCE TO RELATED APPLICATIONS

This application is the National Phase of International Application PCT/JP2009/061017 filed Jun. 17, 2009 which designated the U.S. and which claims priority to Japanese Patent Application (JP) 2008-162174 filed Jun. 20, 2008. The noted applications are incorporated herein by reference.

TECHNICAL FIELD

This invention relates to an active ray-curable sealing agent composition, and a member provided with a sealing layer comprised of a cured product of the active ray-curable sealing agent composition.

The active ray-curable sealing agent composition according to the present invention is suitable for sealing an electronic part container therewith for holding a precision electronic circuit element or a precision electronic part, especially suitable for a gasket for a magnetic hard disc drive (HDD) apparatus used as a memory device such as, for example, a computer.

BACKGROUND ART

A sealing agent or a gasket has hitherto been used for sealing an electronic part container for holding a precision electronic circuit element or a precision electronic part, such as, for example, a magnetic hard disc drive apparatus, in order to protect the precision electronic circuit element or the precision electronic part from interference caused by penetration of dusts and humidity.

In recent years, as the above-mentioned sealing agent and the gasket, in order for reducing the plant investment and the processing cost, gaskets are most widely used which are prepared by applying to a member an active ray-curable sealing agent composition using a dispenser or other means, and then irradiating the thus-applied sealing agent composition with ultraviolet ray. As the active ray-curable sealing agent composition, those which are predominantly comprised of an urethane acrylate oligomer having a low hardness and a high flexibility are used for obtaining a sealability sufficient for a gasket (see, for example, international publication WO96/10594).

An urethane acrylate oligomer has a structure such that a polyol ingredient such as polyester polyol, polyether polyol or polycarbonate polyol, a diisocyanate ingredient, and a hydroxyl group-containing monomer ingredient having radically polymerizable unsaturation are chemically bonded together.

In the case when using the above-mentioned urethane acrylate oligomer as the main ingredient of an active energy ray-curable sealing agent composition for sealing an electronic part container such as a magnetic hard disc drive apparatus, a resin structure comprised of repeating units in the urethane acrylate oligomer must be highly polymerized for obtaining a sealing agent having a low hardness, and enhanced flexibility and elongation. However, when the resin structure comprised of the urethane acrylate oligomer is highly polymerized, the content of a radically polymerizable unsaturated group-containing monomer ingredient having a hydroxyl group bonded to a terminal of the resin structure, in the urethane acrylate oligomer, is reduced, namely, the degree of unsaturation in the urethane acrylate oligomer is reduced. This reduction of the degree of unsaturation leads to deterioration in curing characteristics such as reduction in the fate of curing and undercure of the active ray-curable sealing agent composition predominantly comprised of the urethane acrylate oligomer, and further insufficient crosslinking density thereof. The deterioration in curing characteristics tends to cause decrease of performance quality such as physical and mechanical strength and durability of the active energy ray-cured sealing agent composition.

DISCLOSURE OF THE INVENTION

Problems to be Solved by the Invention

In view of the foregoing, a primary object of the present invention is to provide an active energy my-curable sealing agent composition exhibiting a high curability performance and giving a cured sealing agent composition having a low hardness and enhanced flexibility and elongation, and having improved physical and mechanical strength and enhanced durability.

Another object of the present invention is to provide a member provided with a sealing layer, which exhibits a low hardness and enhanced flexibility and elongation, and has improved physical and mechanical strength and enhanced durability.

Means for Solving the Problems

The inventors made extensive research for solving the above-mentioned problems, and have found that those problems can be solved by an active energy ray-curable sealing agent composition predominantly comprised of (A) an unsaturated group-containing urethane resin having a number average molecular weight of 1,000 to 100,000 and a degree of unsaturation of 0.1 to 1 mol/kg, which is obtained by the reaction of (a) a polycarbonate diol having a number average molecular weight of 500 to 3,000, (b) a bifunctional epoxy acrylate or a bifunctional epoxy methacrylate, said epoxy acrylate and epoxy methacrylate having two hydroxyl groups and two ethylenically unsaturated groups in each molecule, and (c) a polyisocyanate; and (B) an acrylic acid ester monomer or a methacrylic acid ester monomer. On the basis of this finding, the present invention has been completed.

Thus, in accordance with the present invention, there is provided an active energy ray-curable sealing agent composition characterized as comprising:

(A) an unsaturated group-containing urethane resin having a number average molecular weight in the range of 1,000 to 100,000 and a degree of unsaturation in the range of 0.1 to 1 mol/kg, which is obtained by the reaction of (a) a polycarbonate diol having a number average molecular weight in the range of 500 to 3,000, (b) a bifunctional epoxy acrylate or a bifunctional epoxy methacrylate, said epoxy acrylate and epoxy methacrylate having two hydroxyl groups and two ethylenically unsaturated groups in each molecule, and (c) a polyisocyanate;

(B) an acrylic acid ester monomer or a methacrylic acid ester monomer, wherein an alcohol residue in each monomer which is ester-bonded with an acyloyl group or a methacryloyl group, is a hydrocarbon group containing or not containing an oxygen atom, which has 1 to 20 carbon atoms and a molecular weight of not larger than 1,000; and (C) a photopolymerization initiator.

In accordance with the present invention, there is further provided a member provided with a sealing layer, which is prepared by applying to a member the above-mentioned active energy ray-curable sealing agent composition, and then irradiating the thus-applied sealing agent composition with active energy rays thereby curing the coating.

Effect of the Invention

The active energy ray-curable sealing agent composition according to the present invention exhibits a high curability performance upon irradiation with an active energy ray and gives a cured product having a low hardness and enhanced flexibility and elongation, and having improved physical and mechanical strength and enhanced durability. Therefore, the active energy ray-curable sealing agent composition is suitable for sealing an electronic part container for holding a precision electronic circuit element or a precision electronic part, for which high reliability is required.

EXPLANATION OF REFERENCE NUMERALS

Figure 1:
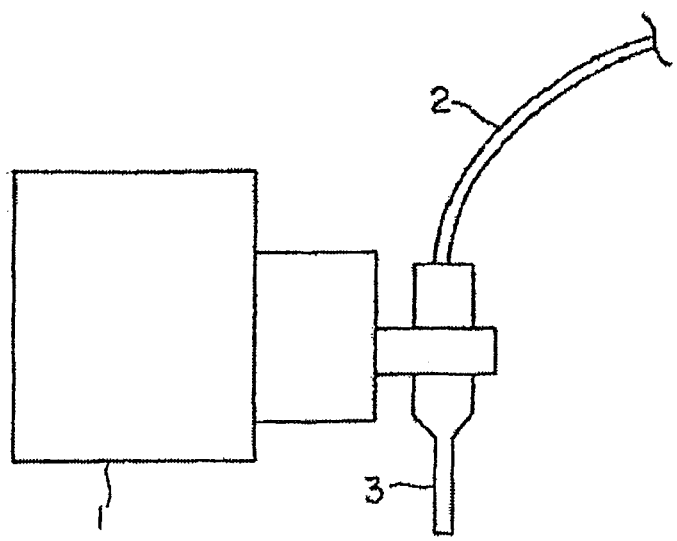
FIG. 1 is an elevational view illustrating an example of an apparatus for ejecting and shaping the active energy ray-curable sealing agent composition according to the present invention.

1 X-Y-Z drive robot control device
2 Curable composition supply tube
3 Dispenser
4 Metal sheet
5 Gasket
6 Airtight sealbility-testing base
7 Supply tube
8 Water-gauge pressure manometer

BEST MODE FOR CARRYING OUT THE INVENTION

The invention will now be described in detail.
The unsaturated group-containing urethane resin (A) used in the present invention is obtained by the reaction of (a) a polycarbonate dial having a number average molecular weight in the range of 500 to 3,000 (said polybcarbonate diol is hereinafter referred to "ingredient (a)" when appropriate), (b) a bifunctional epoxy acrylate or a bifunctional epoxy methacrylate, said epoxy acrylate and epoxy methacrylate having two hydroxyl groups and two ethylenically unsaturated groups in each molecule (said bifunctional epoxy acrylate acrylate or methacrylate is hereinafter referred to "ingredient (b)" when appropriate), and (c) a polyisocyanate (which is hereinafter referred to "ingredient (e)" when appropriate).

The polycarbonate diol (a) has a structure having a polymer chain comprised of hydrocarbon groups derived from a polyol, and bonded via a carbonate bond, and hydroxyl groups bonded at the terminals of the polymer chain. Polycarbonate diol (a) includes, for example, a polycarbonate diol represented by the following formula (a-1).

Formula (a-1):

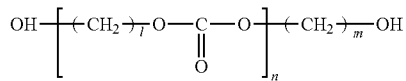

In formula (a-1), l, m and n are integers selected so that the polycarbonate diol (a) has a number average molecular weight in the range of 500 to 3,000. If a polycarbonate diol (a) having a number average molecular weight smaller than the above-mentioned range, a resulting cured sealing agent composition often has a high hardness, and poor flexibility and elongation. In contrast, if a polycarbonate diol (a) having a number average molecular weight larger than the above-mentioned range, the polycarbonate diol (a) tends to have undesirably high crystallizability and high viscosity and its handling property often becomes poor.

Integers l, m and n in formula (a-1) depend on the kind of a polyol used as a raw material. The polyol includes, for example, straight chain diols with 2 to 10 carbon atoms and branched diols with 2 to 10 carbon atoms, and, as specific examples thereof, there can be mentioned ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 3-methyl-1,5-pentanediol, neopentyl glycol, 2-methyl-1,8-octanediol and 1,4-cyclohexanedimethanol. These diols may be used either alone or as a combination of at least two thereof. Of these diols, 1,5-pentanediol and/or 1,6-hexanediol is preferably used.

The ingredient (a) may be used either alone or as a combination of at least two thereof.

The bifunctional epoxy acrylate or methacrylate (b) having two hydroxyl groups and two ethylenically unsaturated groups in the molecule includes, for example, a bifunctional epoxy acrylate represented by the following formula (b-1) or a bifunctional methacrylate corresponding thereto, respectively.

Formula (b-1):

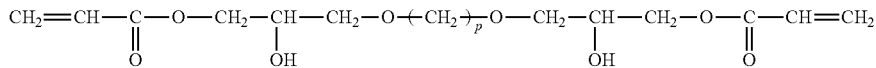

In formula (b-1), p is an integer, and preferably an integer of 2 to 6.

As specific examples of the bifunctional epoxy acrylate represented by formula (b-1) and the bifunctional methacrylate corresponding thereto, there can be mentioned an addition product of acrylic acid or methacrylic acid to propylene glycol diglycidyl ether (acrylic acid and methacrylic acid are hereinafter named generically as "(meth)acrylic acid" when appropriate; and acrylate and methacrylate are hereinafter named generically as "(meth)acrylate" when appropriate), an addition product of (meth)acrylic acid to 1,6-hexanediol diglycidyl ether, an addition product of (meth)acrylic acid to ethylene glycol diglycidyl ether, an addition product of (meth)acrylic acid to 1,4-butanediol diglycidyl ether, an addition product of (meth)acrylic acid to 1,5-pentanediol diglycidyl ether, an addition product of (meth)acrylic acid to 1,7-heptanediol diglycidyl ether, an addition product of (meth)acrylic acid to 1,8-octanediol diglycidyl ether, an addition product of (meth)acrylic acid to neopentyl glycol diglycidyl ether, an addition product of (meth)acrylic acid to bisphenol—A diglycidyl ether and an addition product of (meth)acrylic acid to hydrated bisphenol—A diglycidyl ether. Of these, an addition product of (meth)acrylic acid to propylene glycol diglycidyl ether and an addition product of (meth)acrylic acid to 1,6-hexanediol diglycidyl ether are preferable.

The ingredient (b) may be used either alone or as a combination of at least two thereof.

The polyisocyanate (c) is not particularly limited and preferably includes, for example, diisocyanate compounds such as aliphatic diisocyanate compounds, alicyclic disocyanate compounds and aromatic diisocyanate compounds.

As specific examples of the diisocyanate compounds, there can be mentioned tolylene diisocyanate, 4,4-diphenylmethane diisocyanate, xylylene diisocyanate, xylene diisocyanate, hexamethylene diisocyanate, lysine diisocyanate, 4,4'-methylenebis(cyclohexyl isocyanate), methylcyclohexane-2,4-diisocyanate, methylcyclohexane-2,6-diisocyanate, 1,3-(isocyanate methyl)cyclohexane, isophorone diisocyanate, trimethylhexamethylene diisocyanate, dimmer acid diisocyanate, dianisidine diisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalene diisocyanate, polymethylene polyphenylene diisocyanate, triphenylmethane triisocyanate, tolylene diisocyanate polymer, diphenylmethane diisocyanate polymer, hexamethylene diisocyanate polymer, 3-phenyl-2-ethylene diisocyanate, cumene-2,4-diisocyanate, 4-methoxy-1,3-phenylene diisocyanate, 4-ethoxy-1,3-phenylene diisocyanate, 2,4'-diisocyanate diphenyl ether, 5,6-dimethyl-1,3-phenylene diisocyanate, 4,4'-diisocyanate diphenyl ether, benzidine diisocyanate, 9,10-anthracene diisocyanate, 4,4'-diisocyanate benzyl, 3,3'-dimethyl-4,4'-diisocyanate diphenylmethane, 2,6'-dimethyl-4,4'-diisocyanate diphenyl, 3,3'-dimethoxy-4,4'-diisocyanate diphenyl, 1,4-anthracene diisocyanate, phenylene diisocyanate, 2,4,6-tolylene triisocyanate, 2,4,4'-triisocyanate diphenyl ether, 1,4-tetramethylene diisocyanate, 1,6-hexamethylene diisocyanate, 1,10-decamethylene diisocyanate, 1,3-cyclohexylene diisocyanate and 4,4'-methylene-bis (cyclohexyl isocyanate).

In addition to the diisocyanate compounds, the polyisocyanate (c) further includes, for example, polyisocyanate compounds having at least three isocyanate group such as triphenylmethane-4,4',4"-triisocyanate, 1,3,5-thisocyanatobenzene, 2,4,6-triisocyanatotoluene and 4,4'-dimethyldiphenylmethane-2,2',5,5'-tetraisocyanate; addition products prepared by reacting a polyisocyanate compound with a polyol such as ethylene glycol, propylene glycol, 1,4-butylene glycol, polyalkylene glycol, trimethylolpropane and hexanetriol, at a ratio such that the isocynate groups in the polyisocyanate compound are excessive to the hydroxyl groups in the polyol; buret type adducts such as hexamethylene diisocyanate, isophorone diisocyanate, tolylene diisocyanate, xylylene diisocyanate, 4,4'-diphenylmetahne diisocyanate and 4,4'-methylenebis(cyclohexyl isocyanate); and isocyanuric ring-type adducts.

The polyisocyanate ingredients (c) may be used either alone or as a combination of at least two thereof.

For the preparation of the above-mentioned unsaturated group-containing urethane resin (A), the polyisocyanate ingredient (c) is reacted with a combination of the above-mentioned polycarbonate diol (a) with the bifunctional epoxy acrylate or bifunctional epoxy methacrylate (b), which have two hydroxyl groups and two ethylenically unsaturated groups in each molecule. The thus-prepared unsaturated group-containing urethane resin (A) gives a cured sealing agent composition exhibiting enhanced curability and having good physical and mechanical strengths and enhanced durability which properties are attributed to the ingredient (b), and having a low hardness and enhanced flexibility and elongation which properties are attributed to the ingredient (a).

If the polyisocyanate ingredient (c) is reacted only with the bifunctional epoxy acrylate or bifunctional epoxy methacrylate (b), the resulting unsaturated group-containing urethane resin has a high degree of unsaturation. Therefore, the unsaturated group-containing urethane resin exhibits high curability, but, the resulting cured sealing agent composition has high hardness and insufficient flexibility and elongation, and its performance in sealing quality is not satisfactory.

If the polyisocyanate ingredient (c) is reacted only with the polycarbonate diol (a), the resulting urethane resin does not have unsaturated bonds derived from the ingredient (b), and therefore, it is difficult to cure the urethane resin by irradiation with active energy rays.

If diols other than the polycarbonate diol (a) is used instead of the ingredient (a), or, if a bifunctional epoxy (meth)acrylate, which does not have two hydroxyl groups, is used instead of the ingredient (b), the resulting urethane resin tends to have poor curability, and give a cured sealing agent composition having poor performance in sealing quality.

The unsaturated group-containing urethane resin (A) has a number average molecular weight in the range of 1,000 to 100,000, preferably 10,000 to 50,000 and a degree of unsaturation in the range of 0.1 to 1 mol/kg, preferably 0.1 to 0.5 mol/kg. If the urethane resin (A) has a number average molecular weight lower than the above range, the cured sealing agent composition tends to have undesirably high hardness, and poor flexibility and elongation. In contrast, if the urethane resin (A) has a number average molecular weight higher than the above range, the crystallizability and viscosity of the urethane resin are undesirably high and the production stability is often poor. If the urethane resin (A) has a degree of unsaturation lower than the above range, the curable sealing agent composition has insufficient curing properties, and the cured film exhibits a low crosslinking density, and the cured sealing agent composition tends to have poor physical and mechanical strength and poor durability. In contrast, if the urethane resin (A) has a degree of unsaturation higher than the above range, the curable sealing agent composition exhibits sufficient curing properties, but the cured sealing agent composition tends to have undesirably high hardness, and poor flexibility and elongation.

By the term "degree of unsaturation" as used herein, we mean a value expressed by a product of "$\alpha \times \beta$" wherein $\alpha$ is an amount (mol number) of the ingredient (b) required for the production of 1 kg of the unsaturated group-containing urethane resin, and $\beta$ is number of radically polymerizable unsaturated bonds contained in one molecule of the ingredient (b).

The above-mentioned unsaturated group-containing urethane resin (A) is prepared by reacting the above-mentioned three ingredients (a), (b) and (c).

The reaction can be carried out in the presence or absence of a solvent. As the solvent, an organic solvent is used. The organic solvent includes chemically inactive solvents which are, for example, selected from hydrocarbons, ketones, ethers and esters. After completion of the reaction, the organic solvent used is removed from the produced unsaturated group-containing urethane resin by, for example, distillation under reduced pressure.

The (meth)acrylic acid monomer (B) can be used as a solvent. The (meth)acrylic acid monomer (B) is hereinafter described in detail, and, as specific examples thereof, there can be mentioned 2-ethylhexyl (meth)acrylate, nonyl (meth)acrylate, tetrahydrofurfuryl (meth)acrylate and phenoxydiethylene glycol (meth)acrylate. These (meth)acrylic acid monomers may be used either alone or as a combination of at least two thereof. However, (meth)acrylic acid monomers having a hydroxyl group in the molecule cannot be used as a solvent because the (meth)acrylic acid monomers are reacted undesirably with the ingredients (c) at the step of reacting the ingredients (a), (b) and (c) together for the preparation of the unsaturated group-containing urethane resin (A).

The ingredients (a), (b) and (c) can be directly reacted together without use of the (meth)acrylic acid monomer (B) or an organic solvent for the preparation of the unsaturated group-containing urethane resin (A).

The reaction temperature is usually in the range of 20 to 250° C., preferably 50 to 150° C. The reaction can be appropriately carried out until the isocyanate residue disappears. The reaction time is usually in the range of 10 minutes to 48 hours.

The above-mentioned reaction can be carried out in the absence of a catalyst. However, if desired, a catalyst for promoting the reaction of an isocyanate group with a hydroxyl group can be used. Conventional catalysts may be used, but amine compounds and organic zinc compounds are preferably used as the catalyst because these compounds do not give substantial adverse effect on operation of magnetic hard disc drive apparatuses. As specific examples of the amine compound, there can be mentioned triethylamine, dimethylcyclohexylamine, tetramethylethylenediamine, pentamethyldipropylenediamine, tetramethylguanidine, triethylenediamine, N-methylmorpholine, 1,2-dimethylimidozole, dimethylaminoethanol, dimethylaminoethoxyethanol, triethylaminoethylethanolamine, (2-hydroxyethyl)morpholine-etheramine, N-methylpiperazine, N,N'-dimethylpiperazine and N-endoethylenepiperazine. As specific examples of the organic zinc compound, there can be mentioned zinc 2-ethylcaproate, zinc octenoate, zinc octylate and zinc naththenate.

When using the catalyst, its amount is usually in the range of 0.005 to 0.5 part by weight based on 100 parts by weight of the total of the ingredients (a), (b) and (c).

In the process of reacting the ingredients (a), (b) and (c), a polymerization inhibitor can be added in an appropriate amount for preventing or minimizing polymerization of the unsaturated group and the (meth)acyclic monomer.

The amounts of the ingredients (a), (b) and (c) used are determined depending upon the degree of unsaturation and number average molecular weight and other characteristics, which are required for the unsaturated group-containing urethane resin (A), but, the amounts of (a), (b) and (c) are preferably 60 to 90% by weight, 2.5 to 15% by weight and 5 to 25% by weight, respectively, based on the total of the ingredients (a), (b) and (c).

The (meth)acylic acid ester monomer (B) is a radically polymerizable (meth)acylic acid ester monomer having an alcohol residue, ester-bonded with an (meth)acryloyl group, which residue is a hydrocarbon group (containing or not containing an oxygen atom) having 1 to 20 carbon atoms and a molecular weight of not larger than 1,000. A monofunctional (meth)acrylic acid ester monomer having one (meth)acryloyl group is preferably used for giving a cured sealing agent composition exhibiting greatly reduced hardness and sufficient flexibility and elongation.

As specific examples of the monofunctional (meth)acrylic acid ester monomer, there can be mentioned chain-like (meth)acrylates such as methyl (meth)acrylate, ethyl (meth)acrylate, n-propyl (meth)acrylate, isopropyl (meth)acrylate, n-butyl (meth)acrylate, hexyl (meth)acrylate, 2-ethylhexyl (meth)acrylate, 1-ethylheptyl (meth)acrylate, nonyl (meth)acrylate, isononyl (meth)acrylate, 1-butylamyl (meth)acrylate, lauryl (meth)acrylate and octadecyl (meth)acrylate; (meth)acrylates having a cyclic structure such as isobornyl (meth)acrylate, cyclohexyl (meth)acrylate, tetrahydrofurfuryl (meth)acrylate, phenoxy (meth)acrylate, phenoxyethyl (meth)acrylate, alkylphenoxy (meth)acrylates, alkylphenoxyethyl (meth)acrylates, dicyclopentenyl (meth)acrylate, dicyclopentanyl (meth)acrylate, phenoxydiethylene glycol (meth)acrylate and nonylphenoxypolyethylene glycol (meth)acrylate; hydroxyalkyl (meth)acrylates such as hydroxymethyl (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate and 2-hydroxylauryl (meth)acrylate; and oligo- and poly-oxyalkylene glycol mono(meth)acrylates such as diethylene glycol mono(meth)acrylate, triethylene glycol mono(meth)acrylate, polyethylene glycol mono(meth)acrylate, dipropylene glycol mono(meth)acrylate, trimethylene glycol mono(meth)acrylate and polypropylene glycol mono(meth)acrylate.

Of these monofunctional (meth)acrylic acid ester monomers, tetrahydrofurfuryl (meth)acrylate, phenoxydiethylene glycol (meth)acrylate, nonyl (meth)acrylate, isobornyl (meth)acrylate, nonylphenoxypolyethylene glycol (meth)acrylate, cyclohexyl (meth)acrylate and dicyclopentanyl (meth)acrylate are preferable.

The (meth)acrylic acid ester monomers may be used either alone or as a combination of at least two thereof The photopolyemerization initiator (C) has a function of generating a radical upon light irradiation, which radical initiates radical polymerization of the unsaturated group-containing urethane resin (A) and the (meth)acrylic acid ester monomer (B). Provided that the photopolyemerization initiator (C) has this function, it is not particularly limited, and, conventional photopolymerization initiators can be used.

As specific examples of the photopolymerization initiator, there can be mentioned benzoin, benzoin methyl ether, benzoin ethyl ether, benzoin isobutyl ether, diethoxyacetophenone, 2-hydroxy-2-methyl-1-phenylpropan-1-one, benzyldimethylketal, 1-hydroxycyclohexyl-phenyl ketone, 2-methyl-2-morpholino-(4-thiomethylphenl)propan-1-one, 2-benzyl-2-dimethylamino-1-(4-morpholinophenyl)butanone, 2,4,6-trimethylbenzoyl-diphenylphosphine oxide, 2,4,6-trimethylbenzoylphenyl-ethoxyphosphine oxide, benzophenone, methyl o-benzoylbenzoate, hydroxybenzophenone, 2-isopropylthioxanthone, 2,4-dimethylthioxanthone, 2,4-diethylthioxanthone, 2,4-dichlorothioxanthone, 2,4,6-tris(trichloromethyl)-S-triazine, 2-methyl-4,6-bis(trichloromethyl)-S-triazine, 2-(4-methoxyphenyl)-4,6-bis(trichloromethyl)-S-triazine, iron-arene complexes, and titanocene compounds.

These photopolymerization initiators may be used either alone or as a combination of at least two thereof.

The ratio of the above-mentioned ingredients (A), (B) and (C) is preferably as follows, based on the total of the ingredients (A), (B) and (C). The unsaturated group-containing urethane resin (A) 10 to 90% by weight, the (meth)acrylic acid ester monomer 10 to 90% by weight, and the photopolymerization initiator 0.1 to 10% by weight.

When the amount of the unsaturated group-containing urethane resin (A) is larger than 90% by weight, the sealing agent composition tends to have excessively high viscosity, and the working characteristics such as operation of coating an adherent member with the sealing agent composition by a dispenser or other applicators often become difficult. In contrast, when the amount of the unsaturated group-containing urethane resin (A) is smaller than 10% by weight, the cured sealing agent composition tends to exhibit undesirably high hardness, and poor flexibility and elongation.

When the amount of the (meth)acrylic acid ester monomer (B) is larger than 90% by weight, the cured sealing agent composition tends to exhibit undesirably high hardness, and poor flexibility and elongation. In contrast, when the amount of the (meth)acrylic acid ester monomer (B) is smaller than 10% by weight, the sealing agent composition has excessively high viscosity, and the working characteristics such as operation of coating an adherent member with the sealing agent composition by a dispenser or other applicators often become difficult.

When the amount of the photpolymerization initiator (C) is larger than 10% by weight, the sealing agent composition tends to exhibit poor storage stability, and the cured sealing agent composition tends to have poor physical properties, and outgassing occur to adversely influence precision electronic parts and devices such as a magnetic hard disc drive device. In contrast, when the amount of the photpolymerization initiator (C) is smaller than 0.1% by weight, the curability of resin by active energy ray irradiation is reduced.

If desired, a filler (D) can be incorporated in the sealing agent composition of the present invention. As the filler (D), inorganic fillers and organic fillers which are conventionally used for most curable resin compositions can be used. The filler is preferably a fine particle form. The inorganic filler includes, for example, silica, finely divided quartz, calcium carbonate, mica, talc, titanium dioxide, aluminum silicate, calcium metasilicate, calcium sulfate, barium sulfate, zinc oxide and glass fiber. The organic filler includes fine particles of synthetic resins such as, for example, an acrylic resin, a styrene resin, a phenolic resin, a silicone resin and an urethane resin. The fine filler particles preferably have an average primary particle diameter in the range of 1 nm to 20 μm. The filler may be used either alone or as a combination of at least two thereof.

According to the need, additives such as a polymerization inhibitor, a heat stabilizer, a light stabilizer, an antioxidant, an adhesion-imparting agent, a dispersion aid, a leveling agent, a pigment, a dye, a thermal polymerization initiator and a plasticizer can be appropriately used provided that the effect of the invention is not adversely influenced.

The process for preparing the active energy ray-curable sealing agent composition of the present invention is not particularly limited, and conventional processes can be adopted. For example, the sealing agent composition can be prepared by kneading together the above-mentioned ingredients (A), (B) and (C), or the ingredients (A), (B), (C) and (D), plus optional ingredients, by using a temperature-controllable kneading or mixing means such as, for example, a single screw extruder, a twin screw extruder, a planetary mixer, a biaxial extruder, a biaxial mixer and a high shear mixer. If the (meth)acrylic acid ester monomer (B) is used as a solvent for the preparation of the unsaturated group-containing urethane resin, the reaction mixture can be used as it is as a mixture of the ingredients (A) and (B).

Active energy rays used for curing the active energy ray-curable sealing agent composition of the present invention are not particularly limited, and, as specific examples thereof, there can be mentioned ultraviolet rays, visible light, and lasers including near infrared rays, visible light laser and ultraviolet ray laser. The irradiation dose is usually in the range of 0.2 to 15,000 mJ/cm$^2$, preferably 1 to 10,000 mJ/cm$^2$.

The member with a sealing layer such as a member with a sealing layer, equipped in a magnetic hard disc drive apparatus, is prepared by applying to a member the active energy ray-curable sealing agent composition of the present invention, and then, irradiating the thus-applied sealing agent composition with active energy rays thereby curing the sealing agent composition. The application of the sealing agent composition onto the member can be carried out by a conventional procedure. The active energy rays used for curing are not particularly limited as mentioned above, and include, for example, ultraviolet rays, visible light, and lasers including near infrared rays, visible light laser and ultraviolet laser. The irradiation dose is usually in the range of 0.2 to 15,000 mJ/cm$^2$, preferably 1 to 10,000 mJ/cm$^2$.

EXAMPLES

The invention will now be described specifically by the following examples.

Properties of curable sealing agent compositions and cured sealing agent compositions were evaluated by the methods described in the following test items (1) through (7), and the evaluation results were shown in Table 1 and Table 2, below.

Specimens used for the evaluations were prepared as follows. For specimens for evaluating cured sealing agent compositions in test items (2) to (5), each of the compositions prepared in examples and comparative examples was spread on a quartz glass sheet and then a spacer having a thickness of 2 mm and a quartz sheet were placed in turn thereon. The stacked product was irradiated with ultraviolet rays at a dose of 2,000 mJ/cm$^2$ to give a sheet of the cured sealing agent composition.

Figure 2:
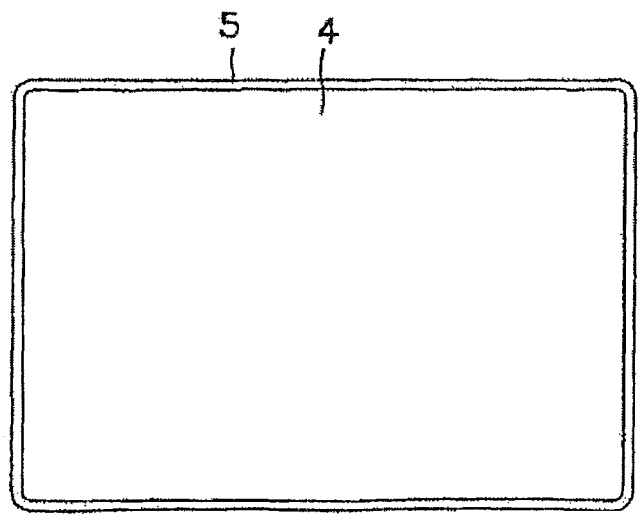
FIG. 2 is a plan view of a member provided with a sealing layer (i.e., a dust cover member) made in Example 9.

For specimens for evaluating cured sealing agent compositions in test items (6) and (7), a metal sheet for dust cover provided in a magnetic hard disc drive device, having a size of 102 mm×146 mm, was degreased, and then a gasket was formed on the periphery of the metal sheet. That is, each of the compositions prepared in examples and comparative examples was placed on the periphery of the metal sheet 4 through a supply tube 2 and a dispenser 3 by using a robot applicator provided with an X-Y-Z drive robot control device 1 as illustrated in FIG. 1, to form a gasket 5 as illustrated in FIG. 2. The placed composition for gasket was irradiated with ultraviolet rays at a dose of 2,000 mJ/cm$^2$ to give a dust cover with the gasket 5 of cured sealing agent composition as illustrated in FIG. 2.

(1) Curing Characteristics

Each of the compositions prepared in examples and comparative examples was spread on a quartz glass sheet and a coating of the composition having a thickness of approximately 100 μm was formed by using an applicator, and then the coating of the composition was irradiated with ultraviolet rays at a dose of 2,000 mJ/cm$^2$. Feeling to the touch of the surface of specimen was examined for evaluating curing characteristics. The evaluation results were expressed according to the following three ratings.

Acceptable (A): no tack was observed.
Medium (M): tack was slightly observed.
Unacceptable (U): tack was clearly observed.

(2) Hardness

Shore hardness A was measured according to JIS K 6253. The evaluation results were expressed according to the following two ratings.

Acceptable (A): Shore A hardness was 15 to 45.
Unacceptable (U): Shore A hardness was larger than 45.

The Shore hardness A in the range of 15 to 45 is suitable as a cured sealing agent composition.

(3) Elongation

Elongation was measured according to JIS K 6251. The evaluation results were expressed according to the following two ratings.

Acceptable (A): elongation of at least 200%.

Medium (M): elongation of between 100% and 200%.

Unacceptable (U): elongation of not larger than 100%.

The larger the elongation of cured sealing agent composition, the more excellent the sealing property thereof.

(4) Tensile Strength

Tensile strength was measured according to JIS K 6251. The numerical values for tensile strength are shown in Tables 1 and 2. The larger the tensile strength value, the more excellent the cured sealing agent composition.

(5) Tear Strength

Tear strength was measured according to JIS K 6252. The numerical values for tensile strength are shown in Tables 1 and 2. The larger the tear strength value, the more excellent the cured sealing agent composition.

(6) Air Tightness

Figure 3:
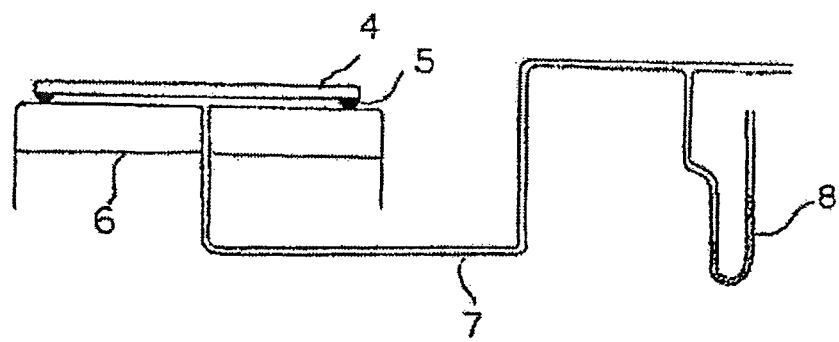
FIG. 3 is a diagrammatical elevational view illustrating an apparatus for evaluating airtight sealability.

Air tightness of gaskets was evaluated by using a test apparatus as illustrated in FIG. 3, placed in a thermostat chamber maintained at 25° C. That is, a metal sheet 4 having a gasket 5 on the periphery thereof was fitted on an airtight sealability-testing base 6 by using a fixture (not shown) so that the gasket 5 was placed in contact with the upper surface of the testing base 6. Air was blown into a closed space between the lower surface of the metal sheet 4 and the upper surface of the base 6, through a supply tube 7, and, when inner the pressure in the closed space reached a water-gauge pressure of 30 mm, the blowing of air was stopped. When ten minutes elapsed, the inner pressure was measured by a water-gauge pressure monometer 8.

When the measured pressure was a water-gauge pressure of 30 mm, the air tightness was expressed as acceptable (A). When the measured pressure was reduced even only to a very slight extent from the water-gauge pressure of 30 mm, the air tightness was expressed as unacceptable (U).

(7) Durability

A metal sheet 4 having a gasket 5 on the periphery thereof was left to stand in an air atmosphere maintained at a temperature of 40° C. and a relative humidity of 90% for 500 hours in a state such that the gasket was at the upper side of the metal sheet. Thereafter the metal sheet with the gasket was placed in a thermostat and maintained at 25° C. for one hour. Then the air tightness was evaluated by the above-mentioned method in test item (6). The evaluation results of air tightness were expressed by the same two ratings, i.e., acceptable (A) and unacceptable (U).

Example 1

One liter four-necked flask equipped with a thermometer, a cooling tube and a stirring apparatus was charged with 341 g of a polycarbonate diol as the ingredient (a) prepared using 1,5-pentanediol and 1,6-hexanediol ("PDCL T-5652" available from Asahi Kasei Chemicals Corporation; number average molecular weight: 2,000), 17 g of an adduct of acrylic acid with 1,6-hexanediol digycidyl ether as the ingredient (b) ("Ripoxy SP-16LDA" available from Showa Denko K.K.), and 43 g of isophorone diisocyanate as the ingredient (c). Further, 377 g of tetrahydrofurfuryl acrylate as a diluent was added as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photopolymerization initiator as the ingredient (C) ("Irgacure 184" available from Ciba Speciality Chemicals Inc.) was added, followed by stirring for 30 minutes for completely dissolving the total content Thus, an active energy-curable sealing agent composition was prepared which was comprised of 50% by weight of an unsaturated group-containing urethane resin as the ingredient (A) having a number average molecular weight of 30,000 and a degree of unsaturation of 0.23 mol/kg, 47% by weight of a (meth)acrylic acid ester monomer as the ingredient (B), and 3% by weight of a photopolymerization initiator as the ingredient (C).

Example 2

One liter four-necked flask equipped with a thermometer, a cooling tube and a stirring apparatus was charged with 348 g of a polycarbonate diol as the ingredient (a) prepared using 1,5-pentanediol and 1,6-hexanediol ("PDCL T-5652" available from Asahi Kasei Chemicals Corporation; number average molecular weight: 2,000), 11 g of an adduct of acrylic acid with 1,6-hexanediol digycidyl ether as the ingredient (b) ("Ripoxy SP-16LDA" available from Showa Denko K.K.), and 42 g of isophorone diisocyanate as the ingredient (c). Further, 377 g of tetrahydrofurfuryl acrylate as a diluent was added as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photopolymerization initiator as the ingredient (C) ("Irgacure 184" available from Ciba Speciality Chemicals Inc.) was added, followed by stirring for 30 minutes for completely dissolving the total content Thus, an active energy-curable sealing agent composition was prepared which was comprised of 50% by weight of an unsaturated group-containing urethane resin as the ingredient (A) having a number average molecular weight of 30,000 and a degree of unsaturation of 0.11 mol/kg, 47% by weight of a (meth)acrylic acid ester monomer as the ingredient (B), and 3% by weight of a photopolymerization initiator as the ingredient (C).

Example 3

One liter four-necked flask equipped with a thermometer, a cooling tube and a stirring apparatus was charged with 341 g of a polycarbonate diol as the ingredient (a) prepared using 1,6-hexanediol ("Nippolan N-980R" available from Nippon Polyurethane Industry Co., Ltd.; number average molecular weight: 2,000), 17 g of an adduct of acrylic acid with 1,6-hexanediol digycidyl ether as the ingredient (b) ("Ripoxy SP-16LDA" available from Showa Denko K.K.), and 43 g of isophorone diisocyanate as the ingredient (c). Further, 401 g of tetrahydrofurfuryl acrylate as a diluent was added as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photo-polymerization initiator as the ingredient (C) ("Irgacure 184" available from Ciba Speciality Chemicals Inc.) was added, followed by stirring for 30 minutes for completely dissolving the total content.

Thus, an active energy-curable sealing agent composition was prepared which was comprised of 50% by weight of an unsaturated group-containing urethane resin as the ingredient (A) having a number average molecular weight of 30,000 and a degree of unsaturation of 0.23 mol/kg, 47% by weight of a (meth)acrylic acid ester monomer as the ingredient (B), and 3% by weight of a photopolymerization initiator as the ingredient (C).

Example 4

One liter four-necked flask equipped with a thermometer, a cooling tube and a stirring apparatus was charged with 348 g of a polycarbonate diol as the ingredient (a) prepared using 1,5-pentanediol and 1,6-hexanediol ("PDCL T-5652" available from Asahi Kasei Chemicals Corporation; number average molecular weight: 2,000), 11 g of an adduct of acrylic acid with propylene glycol digycidyl ether as the ingredient (b) ("Epoxyester 70PA" available from Kyoei Kagaku Kogyo K.K), and 42 g of isophorone diisocyanate as the ingredient (c). Further, 377 g of tetrahydrofurfuryl acrylate as a diluent was added as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photo-polymerization initiator as the ingredient (C) ("Irgacure 184" available from Ciba Speciality Chemicals Inc.) was added, followed by stirring for 30 minutes for completely dissolving the total content.

Thus, an active energy-curable sealing agent composition was prepared which was comprised of 50% by weight of an unsaturated group-containing urethane resin as the ingredient (A) having a number average molecular weight of 30,000 and a degree of unsaturation of 0.11 mol/kg, 47% by weight of a (meth)acrylic acid ester monomer as the ingredient (B), and 3% by weight of a photopolymerization initiator as the ingredient (C).

Example 5

One liter four-necked flask equipped with a thermometer, a cooling tube and a stirring apparatus was charged with 278 g of a polycarbonate diol as the ingredient (a) prepared using 1,5-pentanediol and 1,6-hexanediol ("PDCL T-5650J" available from Asahi Kasei Chemicals Corporation; number average molecular weight: 800), 34 g of an adduct of acrylic acid with 1,6-hexanediol digycidyl ether as the ingredient (b) ("Ripoxy SP-16LDA" available from Showa Denko K.K.), and 88 g of isophorone diisocyanate as the ingredient (c). Further, 376 g of tetrahydrofurfuryl acrylate as a diluent was added as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photo-polymerization initiator as the ingredient (C) ("Irgacure 184" available from Ciba Speciality Chemicals Inc.) was added, followed by stirring for 30 minutes for completely dissolving the total content.

Thus, an active energy-curable sealing agent composition was prepared which was comprised of 50% by weight of an unsaturated group-containing urethane resin as the ingredient (A) having a number average molecular weight of 17,000 and a degree of unsaturation of 0.47 mol/kg, 47% by weight of a (meth)acrylic acid ester monomer as the ingredient (B), and 3% by weight of a photopolymerization initiator as the ingredient (C).

Example 6

The same procedures as described in Example 1 were carried out wherein phenoxydiethylene glycol acrylate was used as the ingredient (B) instead of tetrahydrofurfuryl acrylate with all other conditions remaining the same.

Thus, an active energy-curable sealing agent composition was prepared which was comprised of 50% by weight of an unsaturated group-containing urethane resin as the ingredient (A) having a number average molecular weight of 30,000 and a degree of unsaturation of 0.23 mol/kg, 47% by weight of a (meth)acrylic acid ester monomer as the ingredient (B), and 3% by weight of a photopolymerization initiator as the ingredient (C).

Example 7

The same procedures as described in Example 1 were carried out wherein a mixture of 188.5 g of tetrahydrofurfuryl acrylate and 188.5 of phenoxydiethylene glycol acrylate was used as the ingredient (B) instead of 377 g of tetrahydrofurfuryl acrylate with all other conditions remaining the same.

Thus, an active energy-curable sealing agent composition was prepared which was comprised of 50% by weight of an unsaturated group-containing urethane resin as the ingredient (A) having a number average molecular weight of 30,000 and a degree of unsaturation of 0.23 mol/kg, 47% by weight of a (meth)acrylic acid ester monomer as the ingredient (B), and 3% by weight of a photopolymerization initiator as the ingredient (C).

Example 8

A two-liter planetary mixer was charged with 600 g of the same active energy ray-curable sealing agent composition as prepared in Example 1, and 48 g of a silica powder ("Aerosil 200" available from Nippon Aerosil Co., Ltd.) as the ingredient (D). The content was stirred at 60° C. for approximately 6 hours to give an active energy ray-curable sealing agent composition comprised of 100 parts by weight of the sum of the ingredients (A), (B) and (C) and 8 parts by weight of the filler (ingredient (D)).

Comparative Example 1

One liter four-necked flask equipped with a thermometer, a cooling tube and a stirring apparatus was charged with 341 g of a polycaprolactone diol ("PCL-220N" available from Daicel Chemical Industries, Ltd.; number average molecular weight: 2,000) as the ingredient (a) instead of polycarbonate diol, 17 g of an adduct of acrylic acid with 1,6-hexanediol digycidyl ether as the ingredient (b) ("Ripoxy SP-16LDA" available from Showa Denko K.K.), and 43 g of isophorone diisocyanate as the ingredient (c). Further, 377 g of tetrahydrofurfuryl acrylate as a diluent was added as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photo-polymerization initiator as the ingredient (C) ("Irgacure 184" available from Ciba Speciality Chemicals Inc.) was added, followed by stirring for 30 minutes for completely dissolving the total content Thus, an active energy-curable sealing agent composition was prepared which was comprised of 50% by weight of an unsaturated group-containing urethane resin having a number average molecular weight of 30,000 and a degree of unsaturation of 0.23 mol/kg, 47% by weight of a (meth)acrylic acid ester monomer as the ingredient (B), and 3% by weight of a photopolymerization initiator as the ingredient (C).

Comparative Example 2

One liter four-necked flask equipped with a thermometer, a cooling tube and a stirring apparatus was charged with 280.2 g of an adduct of acrylic acid with 1,6-hexanediol digycidyl ether as the ingredient (b) ("Ripoxy SP-16LDA" available from Showa Denko K.K.), and 120 g of isophorone diisocyanate as the ingredient (c). Polycarbonate diol as the ingredient (a) was not used. Further, 376.2 g of tetrahydrofurfuryl acrylate as a diluent was added to the content as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photo-polymerization initiator as the ingredient (C) ("Irgacure 184" available from Ciba Speciality Chemicals Inc.) was added, followed by stirring for 30 minutes for completely dissolving the total content Thus, an active energy-curable sealing agent composition was prepared which was comprised of 50% by weight of an unsaturated group-containing urethane resin having a number average molecular weight of 4,000 and a degree of unsaturation of 3.8 mol/kg, 47% by weight of a (meth)acrylic acid ester monomer as the ingredient (B), and 3% by weight of a photopolymerization initiator as the ingredient (C).

Comparative Example 3

One liter four-necked flask equipped with a thermometer, a cooling tube and a stirring apparatus was charged with 360 g of a polycarbonate diol as the ingredient (a) prepared using 1,5-pentanediol and 1,6-hexanediol ("PDCL T-5652" available from Asahi Kasei Chemicals Corporation; number average molecular weight: 2,000), and 40 g of isophorone diisocyanate as the ingredient (c). A bifunctional epoxy (meth) acrylate having two hydroxyl groups and two ethylenically unsaturated groups in the molecule as the ingredient (b) was not used. Further, 376 g of tetrahydrofurfuryl acrylate as a diluent was added as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photo-polymerization initiator as the ingredient (C) ("Irgacure 184" available from Ciba Speciality Chemicals Inc.) was added, followed by stirring for 30 minutes for completely dissolving the total content Thus, an active energy-curable sealing agent composition was prepared which was comprised of 50% by weight of an urethane resin containing no unsaturated group and having a number average molecular weight of 30,000 and a degree of unsaturation of 0 mol/kg, 47% by weight of a (meth)acrylic acid ester monomer as the ingredient (B), and 3% by weight of a photopolymerization initiator as the ingredient (C).

Comparative Example 4

One liter four-necked flask equipped with a thermometer, a cooling tube and a stirring apparatus was charged with 325 g of a polycarbonate diol as the ingredient (a) prepared using 1,5-pentanediol and 1,6-hexanediol ("PDCL T-5652" available from Asahi Kasei Chemicals Corporation; number average molecular weight: 2,000), 25 g of an adduct of acrylic acid with gycidyl methacrylate ("NK Ester 701A" available from Shin Nakamura Chemical Co., Ltd.) instead of the ingredient (b), and 50 g of isophorone diisocyanate as the ingredient (c). Further, 376 g of tetrahydrofurfuryl acrylate as a diluent was added as the ingredient (B). The content was stirred at 70° C. for approximately 48 hours whereby the ingredients were reacted together. The completion of reaction was confirmed by dissipation of a isocyanate residue by infrared adsorption spectroscopic analysis.

After the completion of reaction, 24 g of a photo-polymerization initiator as the ingredient (C) ("Irgacure 184" available from Ciba Speciality Chemicals Inc.) was added, followed by stirring for 30 minutes for completely dissolving the total content.

Thus, an active energy-curable sealing agent composition was prepared which was comprised of 50% by weight of an unsaturated group-containing urethane resin as the ingredient (A) having a number average molecular weight of 15,000 and a degree of unsaturation of 0.56 mol/kg, 47% by weight of a (meth)acrylic acid ester monomer as the ingredient (B), and 3% by weight of a photopolymerization initiator as the ingredient (C).

Comparative Example 5

One liter four-necked flask equipped with a thermometer, a cooling tube and a stirring apparatus was charged with 400 g of an urethane acrylate oligomer ("Kayarad UX-3301" available from Nippon Kayaku Co., Ltd.; number average molecular weight: 6,200) instead of the ingredient (A), and 376 g of tetrahydrofurfuryl acrylate as the ingredient (B). Further, 24 g of a photopolymerization initiator as the ingredient (C) ("Irgacure 184" available from Ciba Speciality Chemicals Inc.) was added, followed by stirring at 60° C. for one hour for completely dissolving the total content to prepare a uniform solution.

Thus, an active energy-curable sealing agent composition was prepared which was comprised of 50% by weight of an urethane acrylate oligomer, 47% by weight of a (meth)acrylic acid ester monomer as the ingredient (B), and 3% by weight of a photopolymerization initiator as the ingredient (C).

Comparative Example 6

One liter four-necked flask equipped with a thermometer, a cooling tube and a stirring apparatus was charged with 400 g of an urethane acrylate oligomer ("Kayarad UX-3204" available from Nippon Kayaku Co., Ltd.; number average molecular weight: 9,200) instead of the ingredient (A), and 376 g of tetrahydrofurfuryl acrylate as the ingredient (B). Further, 24 g of a photopolymerization initiator as the ingredient (C) ("Irgacure 184" available from Ciba Speciality Chemicals Inc.) was added, followed by stirring at 60° C. for one hour for completely dissolving the total content to prepare a uniform solution.

Thus, an active energy-curable sealing agent composition was prepared which was comprised of 50% by weight of an urethane acrylate oligomer, 47% by weight of a (meth)acrylic acid ester monomer as the ingredient (B), and 3% by weight of a photopolymerization initiator as the ingredient (C).

Comparative Example 7

One liter four-necked flask equipped with a thermometer, a cooling tube and a stirring apparatus was charged with 400 g of an urethane acrylate oligomer ("UA-344PZ-A" available from Shin-Nakamura Chemical Co., Ltd.; number average molecular weight: 13,000) instead of the ingredient (A), and 376 g of tetrahydrofurfuryl acrylate as the ingredient (B). Further, 24 g of a photopolymerization initiator as the ingredient (C) ("Irgacure 184" available from Ciba Speciality Chemicals Inc.) was added, followed by stirring at 60° C. for one hour for completely dissolving the total content to prepare a uniform solution.

Thus, an active energy-curable sealing agent composition was prepared which was comprised of 50% by weight of an urethane acrylate oligomer, 47% by weight of a (meth)acrylic acid ester monomer as the ingredient (B), and 3% by weight of a photopolymerization initiator as the ingredient (C).

Example 9

A metal sheet for dust cover provided in a magnetic hard disc drive device, having a size of 102 mm×146 mm, was degreased and a gasket was formed on the periphery of the metal sheet. That is, the active energy ray-curable sealing agent composition prepared in Example 1 was placed on the periphery of the metal sheet 4 through a dispenser 3 by using a robot applicator as illustrated in FIG. 1. The composition for gasket was irradiated with ultraviolet rays at a dose of 2,000 mJ/cm$^2$ to give a dust cover with the gasket 5 of cured sealing agent composition as illustrated in FIG. 2.

The gasket 5, formed on the periphery of the metal sheet 4 as illustrated in FIG. 2, had a width of 2 mm (in which the gasket was in contact with the metal sheet) and a height of 1 mm from the surface of metal sheet 4. The sealing agent composition for gasket was cured by the irradiation with ultraviolet rays, and the gasket had a cross-section with an approximately half circle shape.

The gasket was fixedly set at a predetermined position simultaneously with shaping, and thus, it can be manufactured easily and efficiently.

As seen from the properties of the cured sealing agent composition as evaluated and expressed in Table 1, a dust cover having the gasket is suitable as a member with a sealing layer, provided in an electronic part container for holding a precision electronic circuit element or a precision electronic part, such as, for example, a magnetic hard disc drive apparatus.

TABLE 1

|  | Examples | | | | | | | |
| --- | --- | --- | --- | --- | --- | --- | --- | --- |
|  | 1 | 2 | 3 | 4 | 5 | 6 | 7 | 8 |
| Curing characteristics | A | A | A | A | A | A | A | A |
| Shore hardness A | A | A | A | A | A | A | A | A |
| Elongation | A | A | A | A | A | A | A | A |
| Tensilr strength (MPa) | 7.3 | 6.7 | 7.6 | 6.4 | 9.5 | 6.9 | 7.1 | 7.5 |
| Tear strength (N/mm) | 8.1 | 7.5 | 8.4 | 7.3 | 10.7 | 7.7 | 7.9 | 8.8 |
| Air tightness | A | A | A | A | A | A | A | A |
| Durability | A | A | A | A | A | A | A | A |

TABLE 2

|  | Comparative Examples | | | | | | |
| --- | --- | --- | --- | --- | --- | --- | --- |
|  | 1 | 2 | 3 | 4 | 5 | 6 | 7 |
| Curing characteristics | U | A | * | M | A | M | U |
| Shore hardness A | A | U | — | A | U | A | A |
| Elongation | A | U | — | U | U | A | A |
| Tensilr strength (MPa) | 2.3 | — | — | — | — | 3.7 | 2.8 |
| Tear strength (N/mm) | 3.6 | — | — | — | — | 5.5 | 4.9 |
| Air tightness | A | U | — | U | U | A | A |
| Durability | U | — | — | — | — | U | U |

Note,
* Not cured

INDUSTRIAL APPLICABILITY

The active energy ray-curable sealing agent composition according to the present invention exhibits a high curability performance upon irradiation with active energy rays and gives a cured product having a low hardness and enhanced flexibility and elongation, and having improved physical and mechanical strength and enhanced durability.

Utilizing the above-mentioned characteristics, the active energy ray-curable sealing agent composition is suitable for sealing an electronic part container for holding a precision electronic circuit element or a precision electronic part, for which high reliability is required. The sealing agent composition is especially suitable for a gasket of a magnetic hard disc drive (HDD) apparatus used as a memory device such as, for example, a computer.

The invention claimed is:

1. An active energy ray-curable sealing agent composition characterized as comprising:

(A) an unsaturated group-containing urethane resin having a number average molecular weight in the range of 1,000 to 100,000 and a degree of unsaturation in the range of 0.1 to 1 mol/kg, which is obtained by the reaction of (a) a polycarbonate diol having a number average molecular weight in the range of 500 to 3,000, (b) a bifunctional epoxy acrylate or a bifunctional epoxy methacrylate, said epoxy acrylate and epoxy methacrylate having two hydroxyl groups and two ethylenically unsaturated groups in each molecule, and (c) a polyisocyanate;

(B) tetrahydrofurfuryl (meth)acrylate; and (C) a photopolymerization initiator.

2. The active energy ray-curable sealing agent composition according to claim 1, wherein the amounts of the ingredients (A), (B) and (C) are 10 to 90% by weight, 10 to 90% by weight, and 0.1 to 10% by weight, respectively, based on the total weight of the ingredients (A), (B) and (C).

3. The active energy ray-curable sealing agent composition according to claim 1 which further comprises:

(D) a filler in an amount of 0.1 to 10 parts by weight based on 100 parts by weight of the total of the ingredients (A), (B) and (C).

4. The active energy ray-curable sealing agent composition according to claim 1 wherein the unsaturated group-containing urethane resin (A) is obtained by the reaction of 60 to 90% by weight of the ingredient (a), 2.5 to 15% by weight of the ingredient (b), and 5 to 25% by weight of the ingredient (c), based on the total weight of the ingredients (a), (b) and (c).

5. The active energy ray-curable sealing agent composition according to claim 1 wherein the polycarbonate diol (a) is a compound represented by the following formula (a-1):

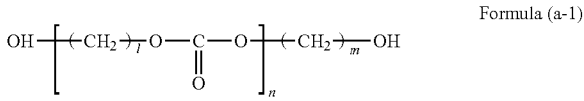

Formula (a-1)

wherein l, m and n are integers selected so that the polycarbonate diol (a) has a number average molecular weight in the range of 500 to 3,000.

6. The active energy ray-curable sealing agent composition according to claim 1 wherein the bifunctional epoxy acrylate or the bifunctional epoxy methacrylate (b) is a bifunctional epoxy acrylate represented by the following formula (b-1) or a bifunctional methacrylate corresponding thereto, respectively:

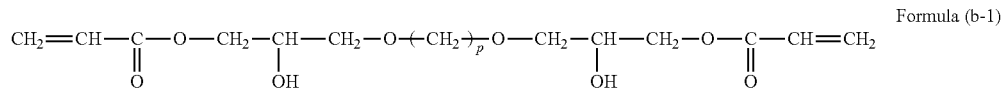 [SMILES: C=CC(=O)OCC(O)COCOCC(O)COC(=O)C=C]

Formula (b-1)

wherein p is an integer of 2-6.

7. The active energy ray-curable sealing agent composition according to claim 1 wherein the polyisocyanate (c) is a disocyanate compound selected from the group consisting of aliphatic diisocyanate compounds, alicyclic disocyanate compounds and aromatic diisocyanate compounds.

8. A member provided with a sealing layer, which is prepared by applying to a member the active energy ray-curable sealing agent composition as claimed in claim 1 and then irradiating the thus-applied sealing agent composition with active energy rays thereby curing the coating.

* * * * *